UNITED STATES PATENT OFFICE.

ERNST F. ALTHANS, OF BRESLAU, AND OTTO JUNGHANN AND HERMANN ÜLSMANN, OF STADT KOENIGSHUETTE, PRUSSIA, GERMAN EMPIRE.

IMPROVEMENT IN FIRE-PROOF COMPOUNDS FOR LINING FURNACES, CONVERTERS, AND FOR OTHER PURPOSES.

Specification forming part of Letters Patent No. 222,224, dated December 2, 1879; application filed August 20, 1879.

*To all whom it may concern:*

Be it known that we, ERNST F. ALTHANS, of Breslau, in the Kingdom of Prussia and Empire of Germany, and OTTO JUNGHANN and HERMANN ÜLSMANN, of Stadt Koenigshuette, in the Kingdom of Prussia and Empire of Germany, have invented a new and useful Improvement in Fire-Proof Compounds for Lining Furnaces, Converters, and for other purposes, which invention is fully set forth in the following specification.

This invention relates to a fire-proof compound, consisting of limestone or dolomite and of a chloride or of hydrochloric acid mixed together in substantially the proportions hereinafter set forth, and subjected to the treatment described.

In preparing our fire-proof compound we reduce limestone, marble, chalk, dolomitic limestone, or dolomite to a very fine powder by grinding, crushing, or other means. These substances must all be free of any acid reagent, as silicic acid, clay, oxides of iron, and the like. After being reduced to a fine powder, a watery solution of chloride of magnesium is poured onto the limestone, dolomite, or other materials above named, and the mixture is kneaded into a dough-like plastic mass. This plastic mass acts similar to tiles or potters' clay, composed of clay and quartz sand, since the cohesive solution of chloride of magnesium, in being dried, hardens into a glasslike substance, and mechanically cements or binds the loose lime-like or dolomitic base powder, which consists of carbonates, in such manner that the same can be kept in dry places and burned, or it can be kept unburned until such time as it is to be used.

In very high degrees of heat, the soft mass, resembling soft sandstone, is fritted into a hard, porous, and fire-proof substance of a dark color.

For building-blocks which are exposed to moisture and rain, this compound cannot be used, since it is soluble in water, and even when fritted still contains soluble chloride of magnesium, and would soon crumble to pieces if exposed to the air.

Tiles or vessels are prepared from this plastic material in a similar manner as such articles are made from clay. The same are molded or formed, dried, and then burned, or, what is better, are kept unburned, so that those parts which are not directly exposed to heat, and which still retain the carbonic acid of the limestone or dolomite, will not crumble to pieces under atmospheric influence.

The articles thus manufactured can be used for various metallurgical purposes or in the construction of furnaces and the like.

The tiles are cemented by means of a cement formed by diluting the original plastic mass with water.

When this compound is to be used as lining for furnaces or converters, it can be employed in its plastic state by spreading one or more layers over the interior of the furnace or other apparatus, pounding or compressing the same, and after slowly drying this lining will become gradually burned when the apparatus is put in use.

The dolomites should only contain small quantities of carbonate of magnesia, or else such an amount of burnt lime that the proper proportion of carbonate of magnesia is formed in the mixture, since an excess of the latter diminishes the fire-proof character of the compound.

Thoroughly pure lime or marble can be used, but yields a less durable product, since the addition of magnesia facilitates the binding or cementing of the material by fritting on exposure to heat.

In place of dolomite, magnesite or artificial carbonate of magnesia can be added to the lime.

In place of chloride of magnesium, chloride of calcium or hydrochloric acid can be used to cement or bind the mass. In these latter cases the proportion of carbonate of magnesia in the base material must be correspondingly increased.

Burnt lime or burnt dolomite or magnesite could be added to the raw base material, composed of carbonate of lime or carbonate of magnesia, which, under certain conditions, would yield a cement like that described in the patent of Sorel, No. 100,945, dated March 13, 1870; but such procedure cannot be recommended, since thereby the working of the plastic material is rendered more difficult and the durability of the mass on exposure to heat is diminished, for it is necessary that the binding or cementing of the base material take place by means of a cement acting in a purely mechanical manner, and which is transformed from a watery solution into a hard and fire-proof condition, so that even if the carbonic acid is expelled from the limestone and other substances the base material does not crack or crumble and lose its consistency.

In order to facilitate the binding of the material on exposure to higher degrees of heat, a small addition (about three-fourths per cent.) of fluoride of calcium or of cryolite, in a ground and dry condition, to the base material before the addition of the watery cement will prove very effective.

Since the chloride of aluminium, iron, and manganese, in combination with limestone or dolomite, also yield chloride of calcium or magnesium on exposure to heat, and the bases which are set free do not sensibly diminish the fire-proof character of the mixture, and since chlorides of alkalies may supply the place of chlorides of alkaline earths, it is very evident that all such chlorides can be used in greater or less quantities to supply the place of chloride of magnesium or calcium.

The chlorides of alkalies are especially serviceable in rendering the compound soft, and even fusible, on exposure to heat, since an addition of one per cent. thereof already accomplishes this result.

A practical procedure is to sieve the finely-ground base material through a sieve, preferably of brass wire, containing about twenty meshes to a linear inch. After this, pure limestone (or marble, chalk, or the like) is added to the dolomite or dolomitic limestone until the mass contains about four per cent. of carbonate of magnesia, after which about three-fourths per cent. of ground fluoride of calcium is added.

A concentrated solution of chloride of magnesium in water, which may also be prepared from the mother-liquor of salt-brine or from salt-works, is poured into the mixture until it is reduced to a dough of such consistency that it can be packed or balled by hand.

This dough or plastic mixture may be directly spread over the interior of furnaces or metallurgical apparatus, or may be used in the manufacture of tiles and vessels, as above described.

The fluoride of calcium may be omitted without serious disadvantage.

In covering the floors of converters, the tuyeres, which are evenly distributed over about half the space of the floor of the converter, are formed by pounding into the mass wooden plugs, which are afterward pulled out, or they may be formed by boring.

The tuyeres may also be first separately formed and dried, and afterward pounded into the flooring.

The pounded linings, floorings, tiles, and other articles, on exposure to about 130° to 150° centigrade, are slowly dried and sufficiently hardened.

If the mass is oversaturated with water, the tiles and other articles bulge out on being dried. This defect may be cured by means of a knife; but by properly saturating it is entirely avoided.

The tiles and other articles shrink but slightly on being dried, and preserve their regular form, so that they can be cemented with but slight interstices between them. They do not crack on being heated, as neither does the pounded mass, and only on that face which is exposed to heat is formed a cohesive, cinder-like, and thin crust, beneath which the mass preserves its sandstone-like structure.

The tiles and other articles can be burned in ordinary potters' furnaces on a floor of burnt lime, but require that a high degree of heat be kept up for a considerable time, since they are poor conductors of heat.

The use of burnt tiles of the above material does not recommend itself, since they are difficult to cement, and especially because the fritted mass readily crumbles and cracks on exposure to atmospheric influences.

In this process, also, the place of the chloride of magnesium can be supplied wholly or in part by chloride of calcium or hydrochloric acid, provided the proportion of carbonate of magnesia is correspondingly increased.

What we claim as new, and desire to secure by Letters Patent, is—

1. As a new article of manufacture, the fire-proof compound above described, produced by the mixture of limestone or dolomite and of chlorides or hydrochloric acid, substantially as set forth, and by the treatment described.

2. The employment of hydrochloric acid, chloride of magnesium, or of chloride of calcium as a cement or binding material in the manufacture of fire-proof material from limestone, dolomite, or similar materials, substantially as set forth.

This specification signed by us this the 28th day of May, 1879.

ERNST F. ALTHANS.
OTTO JUNGHANN.
HERMANN ÜLSMANN.

Witnesses:
GEORG SCHLEPITZKY,
PAUL KRAUSE.